United States Patent
Lelkens

(10) Patent No.: US 9,996,057 B2
(45) Date of Patent: Jun. 12, 2018

(54) METHODS FOR AUTOMATICALLY COMMISSIONING OF DEVICES OF A NETWORKED CONTROL SYSTEM

(75) Inventor: Armand Michel Marie Lelkens, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 1089 days.

(21) Appl. No.: 14/119,253

(22) PCT Filed: Jun. 5, 2012

(86) PCT No.: PCT/IB2012/052823
§ 371 (c)(1),
(2), (4) Date: Nov. 21, 2013

(87) PCT Pub. No.: WO2012/168859
PCT Pub. Date: Dec. 13, 2012

(65) Prior Publication Data
US 2014/0088772 A1    Mar. 27, 2014

(30) Foreign Application Priority Data
Jun. 7, 2011  (EP) ..................... 11168869

(51) Int. Cl.
*G06F 19/00* (2018.01)
*G05B 11/01* (2006.01)
(Continued)

(52) U.S. Cl.
CPC .......... *G05B 11/01* (2013.01); *H04L 12/2816* (2013.01); *H05B 37/0272* (2013.01)

(58) Field of Classification Search
CPC .. G05B 11/01; H04L 12/2816; H05B 37/0272
(Continued)

(56) References Cited

U.S. PATENT DOCUMENTS 7,020,442 B2 * 3/2006 Najafi .................. H04B 17/318
                                                    370/332
7,092,688 B2 * 8/2006 Lee ....................... H04B 17/318
                                                    455/226.2
(Continued)

FOREIGN PATENT DOCUMENTS

CN        101686486 A      3/2010
WO    WO2007040398 A1     4/2007
(Continued)

OTHER PUBLICATIONS

Techincal Note, Smart Weireless Field Network Recommendation for Planning, Installation, and Commissioning, Feb. 2010, Emerson, p. 1-6.*

*Primary Examiner* — Kidest Bahta
(74) *Attorney, Agent, or Firm* — Meenakshy Chakravorty

(57) ABSTRACT

The invention relates to automatically commissioning of devices of a networked control system, particularly to automatically commissioning of wireless switches in lighting control systems. A basic idea of the invention is to derive from an installation constraints with regard to a networked control system and to consider these constraints during an automatic commissioning process based on signal strength processing. This may help to improve the reliability of commissioning based on signal strengths. An embodiment of the invention relates to a method for automatically commissioning of devices of a networked control system, which comprises one or more first devices (S1-S3) and several second devices (RC1-RC3) being able to communicate wirelessly, wherein wireless signals from first devices (S1-S3) are received by one or more second devices (RC1-RC3) and for each received wireless signal the signal strength is determined, and wherein the commissioning comprises the following steps: processing the determined signal strengths considering constraints derived from an
(Continued)

installation of the networked control system for commissioning, and assigning the first devices (S1-S3) to one or more of the second devices (RC1-RC3) depending on the processing result.

16 Claims, 4 Drawing Sheets

(51) Int. Cl.
*H04L 12/28* (2006.01)
*H05B 37/02* (2006.01)

(58) Field of Classification Search
USPC ......................................................... 700/286
See application file for complete search history.

(56) References Cited

U.S. PATENT DOCUMENTS

| | | | | |
|---|---|---|---|---|
| 7,116,988 B2* | 10/2006 | Dietrich | ................ | G01S 5/0221 |
| | | | | 342/450 |
| 8,180,343 B2* | 5/2012 | Kalhan | ............. | H04W 36/0083 |
| | | | | 370/331 |
| 8,422,401 B1* | 4/2013 | Choong | ............. | H04L 12/2827 |
| | | | | 370/254 |
| 8,503,330 B1* | 8/2013 | Choong | ................ | H04W 24/02 |
| | | | | 370/254 |
| 8,729,835 B2* | 5/2014 | Henig | ................ | H05B 37/0254 |
| | | | | 315/294 |
| 8,742,694 B2* | 6/2014 | Bora | ................... | H05B 33/0863 |
| | | | | 315/113 |
| 2005/0206555 A1 | 9/2005 | Bridgelall | | |
| 2005/0208952 A1* | 9/2005 | Dietrich | ................ | G01S 5/0221 |
| | | | | 455/456.1 |
| 2006/0250980 A1* | 11/2006 | Pereira | ................ | H04L 12/2803 |
| | | | | 370/254 |
| 2008/0009324 A1* | 1/2008 | Patel | ..................... | H04W 48/18 |
| | | | | 455/566 |
| 2008/0042803 A1* | 2/2008 | Posamentier | ........ | G06K 7/0008 |
| | | | | 340/10.1 |
| 2008/0157957 A1 | 7/2008 | Pitchers | | |
| 2008/0218334 A1 | 9/2008 | Pitchers | | |
| 2008/0299927 A1* | 12/2008 | Tenbrook | .............. | H04W 48/16 |
| | | | | 455/226.2 |
| 2009/0066473 A1 | 3/2009 | Simons | | |
| 2010/0114340 A1 | 5/2010 | Huizenga | | |
| 2010/0231363 A1* | 9/2010 | Knibbe | ................ | H04L 12/2803 |
| | | | | 340/286.02 |
| 2012/0021768 A1* | 1/2012 | Rudland | ................ | G06N 3/126 |
| | | | | 455/456.1 |

FOREIGN PATENT DOCUMENTS

| | | |
|---|---|---|
| WO | 2009128001 A2 | 10/2009 |
| WO | 2010075341 A1 | 7/2010 |

* cited by examiner

METHODS FOR AUTOMATICALLY COMMISSIONING OF DEVICES OF A NETWORKED CONTROL SYSTEM

CROSS-REFERENCE TO RELATED APPLICATIONS

This application is a U.S. national stage application under 35 U.S.C. § 371 of International Application No. PCT/IB2012/052823 filed on Jun. 5, 2012, which claims priority to and the benefit of European Patent Application No. 11168869.3, filed on Jun. 7, 2011. These applications are hereby incorporated by reference herein.

TECHNICAL FIELD

The invention relates to automatically commissioning of devices of a networked control system, particularly to automatically commissioning of wireless switches in lighting control systems.

BACKGROUND ART

Networked control systems are an ubiquitous trend in commercial, industrial and institutional business markets and also in consumer markets. A typical example of a networked control system is a lighting control system with dozens of networked, particularly interconnected light sources. In the future, it is expected that these networked lighting systems will evolve particularly due to new developments on lighting sources such as LED (Light Emitting Diode) luminaries leading to a higher number of light sources. Installation, commissioning, configuration and management of lighting control systems is often complex and also a relevant factor with regard to the total cost of ownership. Particularly the commissioning, which is required for identifying devices and specifying their role in lighting control, is a cumbersome task even in wired lighting control systems with a plurality of switches and luminaries and becomes even more daunting in systems where devices have no wired connections, but only communicate wireless, for example using RF (Radio Frequency) transmissions.

In a lighting control system with wired switches, the assignment of the switches (which luminaire(s) they control) is more or less implicit by the wiring. An installer has connected a switch to a certain port on a controller and thereby the function of the switch is clear. A wireless switch, however, is not physically connected to the system and therefore its assignment is totally undefined immediately after installation. This means an extra burden for a commissioner who has to identify and locate the switches in order to be able to tell the system which switch is which. This is a labour intensive and error prone task.

A straight forward solution to assign wireless switches to luminaires in a lighting control system would be to let the receivers in the luminaires take the switches with the strongest RSSI (received signal strength indication) to be the switches from which they should be controlled: when these switches are pressed, by the installer, all luminaires will receive the signal of each switch, but with different RSSI. In principle, the luminaires in the same room as the switch will measure the highest RSSI from the switch in their room, whereas luminaires in other rooms will see a lower RSSI; the farther they are away, the lower the RSSI in general will be. Due to specific conditions, such as obstructing furniture, doors or even the orientation of the antennas, it can happen that some receivers in the same room as the switch receive the signal with lower strength than some receivers in a neighbouring room. This results in a wrong assignment.

In order to improve commissioning, US2008/0157957A1 discloses a method for commissioning wireless lighting nodes in a building by generating a first map of a network topology of a lighting control system installed in the building using received RSSI values and a second map of the network topology using ToF (Time of Flight) values and comparing the two maps to determine the location of partition walls within the building.

SUMMARY OF THE INVENTION

An object of the invention is to provide an improved method and system for automatically commissioning of networked control systems, particularly of wireless switches in lighting control systems.

The object is solved by the subject matter of the independent claims. Further embodiments are shown by the dependent claims.

A basic idea of the invention is to derive from an installation of a networked control system constraints with regard to that networked control system and to consider these constraints during an automatic commissioning process based on signal strength processing. Since signal strength based commissioning can be unreliable due to obstacles between a signal transmitter and receiver, orientation of antennae of RF transmitters, housing of transmitters and receivers, the application of constraints derived from an installation may help to improve the reliability of commissioning based on signal strength processing.

An embodiment of the invention provides a method for automatically commissioning of devices of a networked control system, which comprises one or more first devices and one or more second devices being able to communicate wirelessly, wherein wireless signals from first devices are received by one or more second devices and for each received wireless signal the signal strength is determined, and wherein the commissioning comprises the following steps:

processing the determined signal strengths considering constraints derived from an installation of the networked control system for commissioning, and assigning the first devices to one or more of the second devices depending on the processing result.

This method is not only based on signal strength measurements between two devices for commissioning, which can be a good, but not very reliable indication for the distance between the devices, but also takes into account constraints during a signal strength measurements based commissioning so that a more reliable commissioning may be achieved. The constraints are for example contained in a data set suitable for computation. Constraints are typically values related to the installation and for example determining restrictions of the installation of the networked control system such as a maximum number of first devices assigned to a second device and vice versa.

For example, the installation of the networked control system may comprise one or more rooms and constraints derived from the installation may be one or more of the following:

number of first devices in each room;
number of second devices in each room;
number of rooms to which a first device is assigned.

In each room for example one second device may be used as room controller, and a constraint may be only one first device being assigned to one second device. A further constraint may be for example that a first device may only be assigned to one room controller so that a wireless switch applied as first device can only control the infrastructure installed in the room by means of the respective room controller to which it is assigned, and not the infrastructure of a neighbouring room.

The processing may comprise the following steps:
determining the total signal strength for several different possible assignments of first devices and second devices, which fulfill the constraints derived from the installation of the networked control system, and
selecting the assignment of first devices and second devices with the largest total signal strength among the determined total signal strengths.

The step of determining the total signal strength may comprise a brute force method over all possible permutations of allocations of first devices and second devices or a heuristic method.

The step of processing may further comprise weighting the signal strength of each received wireless signal depending on the installation. For example, values for weighting may be related to installation constraints such as the distance of rooms from a certain location in a building, in which the networked control system is installed.

The values for weighting the signal strengths may be estimated based on actual measurements of the signal strengths of wireless signals.

A further embodiment of the invention provides a computer program enabling a processor to carry out the method according to the invention and as specified herein.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

Another embodiment of the invention provides a computer programmed to perform a method according to the invention and as described above.

A further embodiment of the invention relates to a commissioning tool for a networked control system comprising
communications means for communicating with devices of the networked control system and to receive from one or more second devices signal strengths of wireless signals from first devices received and determined by the one or more second devices, and
processing means being configured to perform a method of the invention and as described above in order to assign the first devices to one or more of the second devices.

A yet further embodiment of the invention provides a networked control system comprising
one or more first devices,
several second devices being adapted for receiving wireless signals from first devices and for determining for each received wireless signal the signal strength, and
a system controller being adapted for
receiving the determined signal strengths,
processing the determined signal strengths considering constraints derived from an installation of the networked control system for commissioning, and
assigning the first devices to one or more of the second devices depending on the processing result.

The system may be a lighting control system and the one or more first devices may be wireless switches and/or computers being adapted for wirelessly communicating with second devices, and the several second devices may be wireless room controller and/or wireless luminaries.

The system may be a lighting control system and the first devices and the second devices may be wireless luminaries. Thus, the assigning of first to second devices is a grouping of wireless luminaries based also on an installation plan and not only on signal strength measurements.

The system controller may be integrated in a second device. For example, the system controller may be part of a luminary of a lighting control system.

The system controller may be configured to perform a method of the invention as described before. For example, the system controller may be a computing device being configured by a program implementing the inventive method for automatically commissioning of devices of a networked control system.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DESCRIPTION OF EMBODIMENTS

Figure 1:
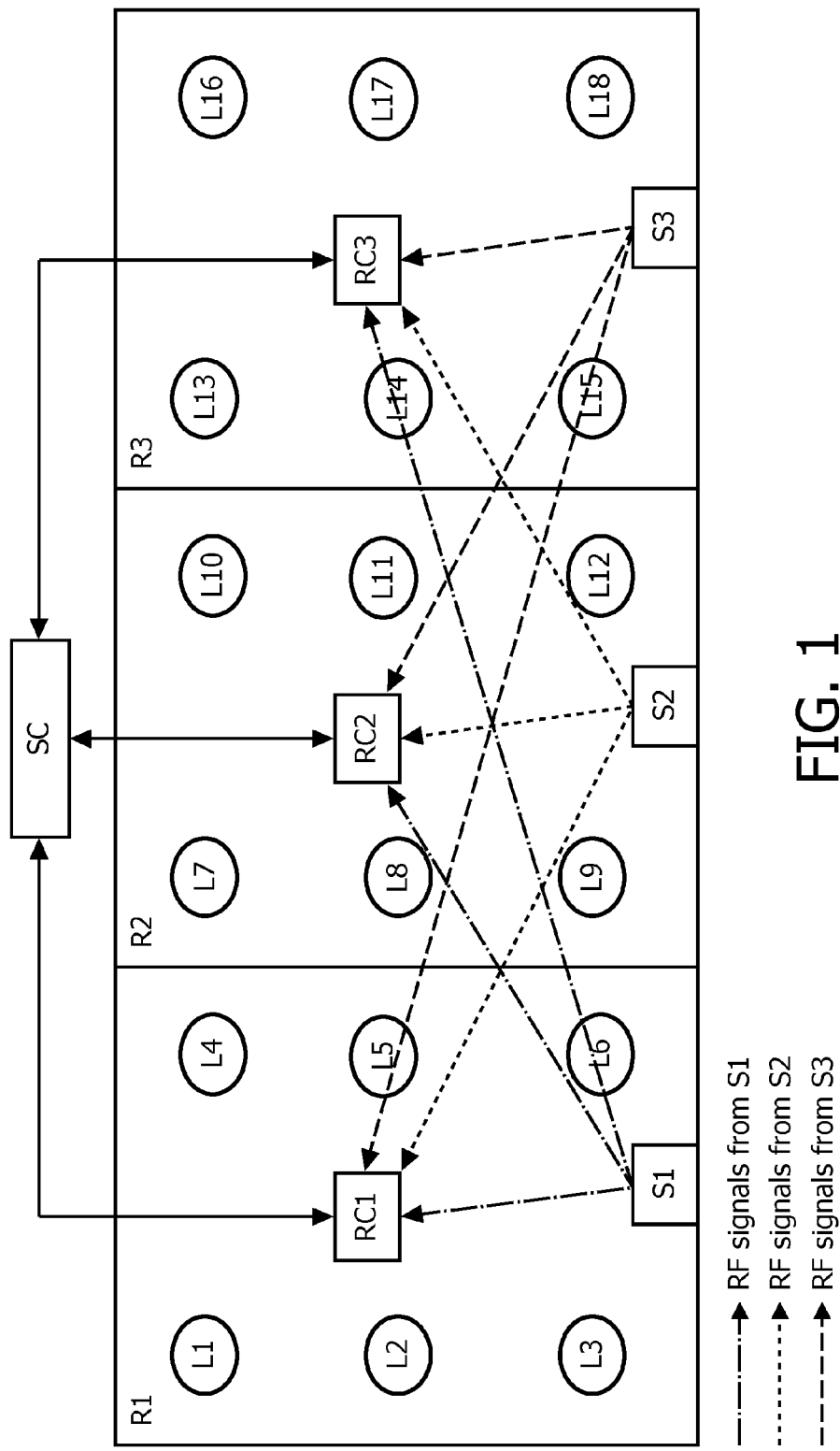
FIG. 1 shows an embodiment of a wireless lighting control system installed in three rooms with several wireless luminaries, room controller, and wireless switches according to the invention.

In the following, functionally similar or identical elements may have the same reference numerals. Furthermore, embodiments of the invention are described by means of lighting control systems even if the present invention is generally applicable to any kind of networked control system comprising several devices using wireless communication, for example RF signal transmission.

FIG. 1 shows an installation of a lighting control system in three rooms R1-R3 of a building. The lighting control system comprises a central system controller SC, in each room one room controller RC1-RC3 and one RF switch S1-S3, and six luminaries L1-L6, L7-L12, L13-L18. Each room controller RC1-RC3 is able to communicate via RF transmission with one or more assigned RF switches S1-S3 and to control the luminaries in the respective room depending on the signaling of the assigned RF switch.

Furthermore, each room controller RC1-RC3 is connected to the central system controller SC, which may manage the lighting control system and particularly perform an automatic commissioning after installation of the lighting control system.

Figure 3:
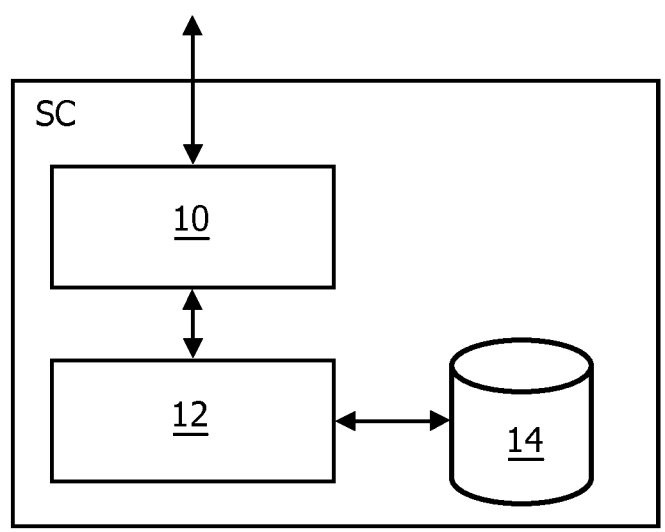
FIG. 3 shows a block diagram of an embodiment of a system controller for a lighting control system according to the invention.

FIG. 3 shows a block diagram of the system controller SC comprising communication means 10, for example a wireless communication module such as a WiFi™, Bluetooth®, ZigBee™ interface and/or a wired communication module such as a LAN (Local Area Network) interface. With the communication means 10, the system controller SC is able to communicate with the room controller RC1-RC3, particularly configure each room controller RC1-RC3 according to the result of the herein described method for the commissioning.

Figure 2:
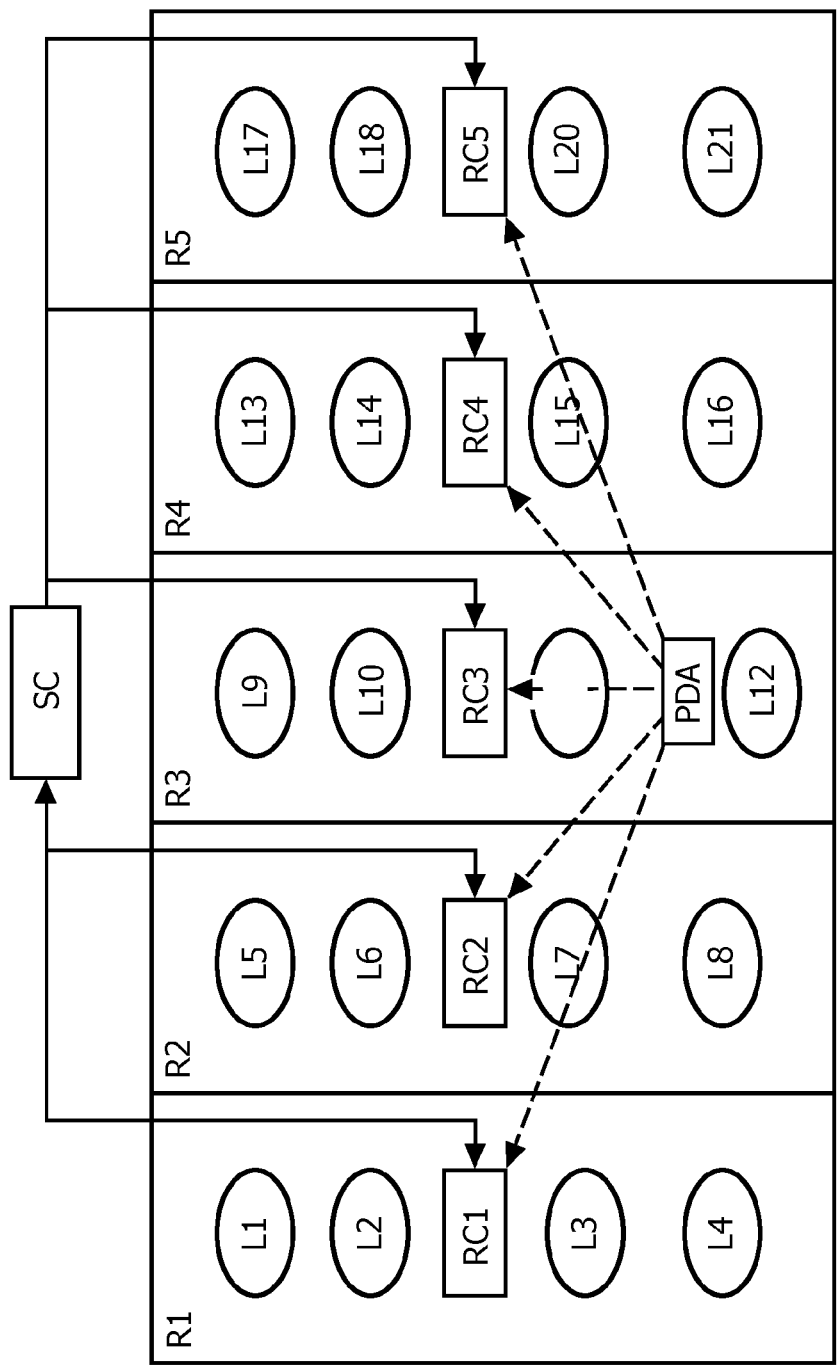
FIG. 2 shows an embodiment of a wireless lighting control system installed in five rooms with several wireless luminaries, room controller, and a PDA as wireless switches according to the invention.

The system controller SC further comprises a processor 12 such as a microcontroller or microprocessor and a memory 14 storing a program configuring the system controller SC for commissioning a lighting control system as shown in FIGS. 1 and 2. The system controller SC can be implemented for example by a specialized control computer for a lighting control system or a standard Personal Computer (PC) with a wireless and/or wired interface and executing a program for commissioning of a lighting control system.

The system controller SC receives a lighting installation plan generated by a project designer, for example via a dedicated program for lighting installation executed by the system controller SC. In this plan, the location of the luminaries L1-L18 and the RF switches S1-S3 is indicated. In an office building there will be several luminaires and one switch per room, as shown in FIG. 1.

Figure 4:
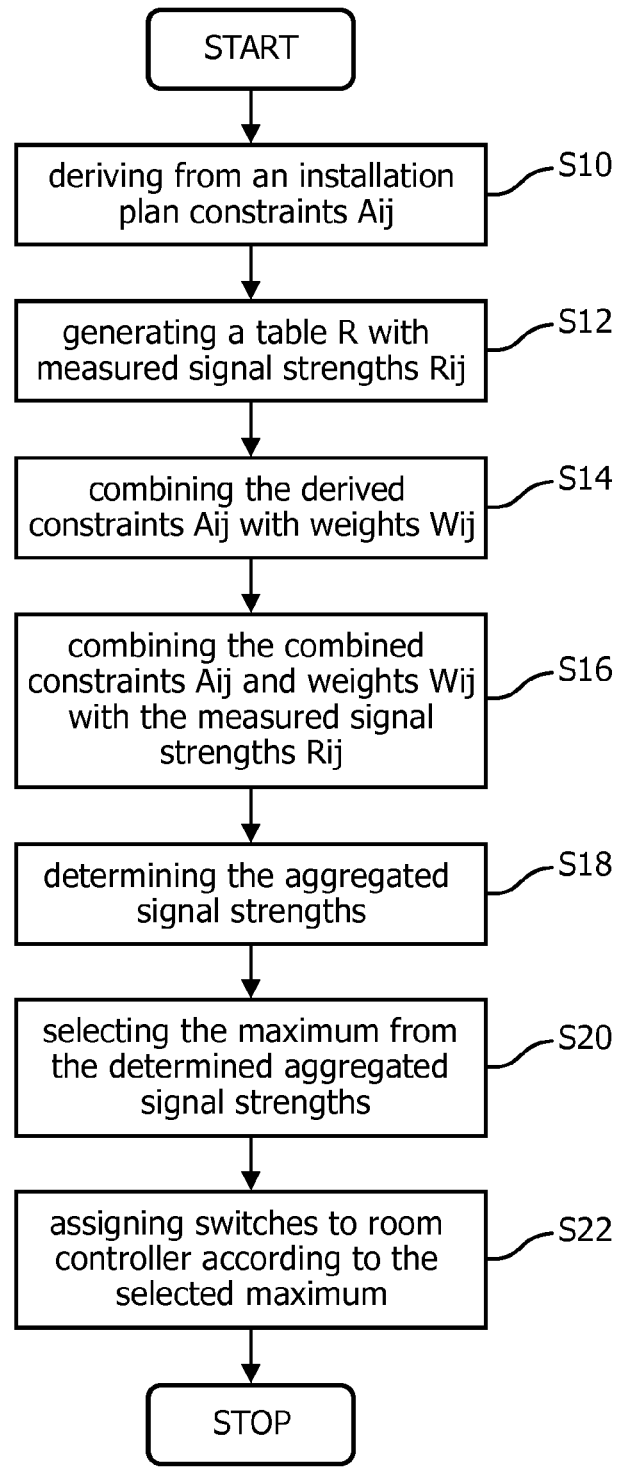
FIG. 4 shows a flowchart of an embodiment of a method for automatically commissioning of devices of a lighting control system.

A flowchart of the commissioning program executed by the system controller SC is shown in FIG. 4. The program automatically derives from the before mentioned plan that there are three rooms R1-R3, each with six wirelessly controllable luminaries L1-L6, L7-L12, L13-L18 and one switch S1-S3. Furthermore, the program derives from the plan that there is a room controller RC1-RC3 in each room R1-R3, that serves as a receiver for the RF transmissions from the switches S1-S3 and that controls the luminaries in that room. In the simplest case, room controllers and luminaires are connected in a wired network and their locations are known.

Due to the RF communication between the room controllers RC1-RC3 and the RF switches S1-S3, each room controller RC1-RC3 receives RF signals from each switch S1-S3, as shown in FIG. 1 by the dotted arrows from the switches S1-S3 to the room controllers RC1-RC3.

In a first step, the Rjk, the strength of the signal of switch k in room j, are measured by the room controller RC1-RC3.

The next task is to determine which switch is in which room, i.e. to assign switch k to room j denoted by $A_{jk}$, where a value of 1 means that switch k is in room j and a value of 0 means that it is not in that room. The aim then is to maximize the total signal strength=$\Sigma Rij*Aij$.

The installation plan tells that there are N rooms and N switches (with N=3 in the example shown in FIG. 1). Therefore, in a first step S10 for commissioning, the program automatically derives the following constraints from the installation plan:

The constraint, which in every room there shall be one switch:

$$\forall j : \sum_{k=1}^{N} Ajk = 1$$

And as further constraint that a switch shall be assigned to only 1 room:

$$\forall k : \sum_{j=1}^{N} Ajk = 1$$

The system controller SC retrieves the measured signal strengths $R_{jk}$ from the room controller RC1-RC3 and generates in step S12 a table R with the measured signal strengths, where each line contains the measurements of one room controller, and each column the measurements of each room controller from one switch. For example, the table or matrix with the measured signal strengths for the example shown in FIG. 1 could be as follows:

$$R = \begin{pmatrix} 50 & 30 & 10 \\ 15 & 30 & 60 \\ 35 & 40 & 50 \end{pmatrix},$$

i.e. room controller RC1 would measure a signal strength value of 50 (arbitrary units) from switch S1, 30 from switch S2 and 10 from switch S3, room controller RC2 would measure a signal strength value of 15 from switch S1, 30 from switch S2 and 60 from switch S3, and room controller RC3 would measure a signal strength value of 35 from switch S1, 40 from switch S2 and 50 from switch S3.

If the room controllers would simply assume that the strongest signal they receive would come from the switch in their room, the assignment would result in S1 controlling room R1 (value 50), switch S3 controlling room R2 (value 60) and switch S3 also in control of room R3 (value 50): switch S3 would therefore control both rooms R2 and R3 and that would not be in conformance with the installation plan.

Thus, the commissioning program executed by the system controller SC determines in the next steps S16 and S18 the aggregated signal strength=$\Sigma Rij*Aij$ for each room controller—switch assignment fulfilling the above constraints derived from the installation plan.

In the following, all aggregated signal strength values taken from the matrix R and fulfilling the constraints derived from the installation plan are listed:

50(RC1–S1)+30(RC2–S2)+50(RC3–S3)=130

50(RC1–S1)+60(RC2–S3)+40(RC3–S2)=150

30(RC1–S2)+15(RC2–S1)+50(RC3–S3)=95

30(RC1–S2)+60(RC2–S3)+35(RC3–S1)=125

10(RC1–S3)+15(RC2–S1)+40(RC3–S2)=65

10(RC1–S3)+30(RC2–S2)+35(RC3–S1)=75

The maximum of the aggregated signal strength values in the above list is 150 so that with knowledge of the constraints derived from the installation plan, the corresponding constraints yields a maximum value of 150 when $$A = \begin{pmatrix} 1 & 0 & 0 \\ 0 & 0 & 1 \\ 0 & 1 & 0 \end{pmatrix},$$

i.e. with switch S1 in room R1, switch S2 in room R3 and switch S3 in room R2. In step S20, the commissioning program selects the maximum from the total aggregated signal strength values and assigns switch S1 to room controller RC1, switch S2 to room controller RC3 and switch S3 to room controller RC2 according to the selected maximum of aggregated signal strength values in a following step S22.

For comparison, with a simple assignment with switch S1 in room R1, switch S2 in room R2 and switch S3 in room R3 the aggregated signal strength value is only 50+30+50=130.

The algorithm for determining A can be implemented by a brute force method over all possible permutations of the matrix R, as described above, or some heuristic method. The above method can be further refined as described in the following.

The optimizing function for the aggregated signal strength as used above only takes the signal strength of each sender, each switch in one room into account. As an improvement, the optimizing function can be extended with a weight function taking into account that some signal from the switches will be received in adjacent rooms: the function to maximize would then become $$\Sigma R_{ij} * (W \circ A)_{ij}$$

where ∘ denotes matrix multiplication. In step S14, the derived constraints Aij are combined with the weights Wij as described before.

If for instance the signal decays with a factor of 2 per room separation between sender and receiver, the relative signal strength in the room of the sender would be 1, in the adjacent room 0.5 and in the next room 0.25, the weight matrix to be used is:

$$W = \begin{pmatrix} 1 & 0.5 & 0.25 \\ 0.5 & 1 & 0.5 \\ 0.25 & 0.5 & 1 \end{pmatrix}$$

The values to be used can be estimated from general experience or from the actual measurements. In fact, these values are not critical; the important thing is that information on the relative position of the rooms and the receivers therein is known and is used in the assignment mechanism.

In a similar way, the method can be extended to incorporate the situation where the wireless receivers are in the luminaires (rather than in room controllers) and thus also the room location of the luminaires is unknown after the installation. Using the data from the installation plan, not only the assignment of the switches but also of the grouping of luminaires and there association to switches can be derived. For example, luminaires could be grouped according to the strength of signals received from other luminaires taking into account, how many luminaires shall be in each room based on an installation plan. Similar to assigning switches to luminaires then a kind of "assignment" luminaires to luminaires can be performed in that luminaries are combined to groups of assigned luminaires. The correctness of this grouping/assignment will be higher if the constraints from the lighting plan are taken into account (because, for instance, the installation plan may determine that there are four lamps in a room and thus the fifth must be in another group/room).

The same algorithm can be used to assign mobile wireless device (a cell phone or PDA) to a (group of) luminaires in the room where the mobile wireless device is at that moment. In that case there is only one sender (the mobile device) and the matrix R reduces to a single row. FIG. 2 shows such as scenario with a PDA as wireless lighting switch. A lighting control system is installed in 5 rooms R1-R5. In each room, 4 wirelessly controllable luminaries L1-L4, L5-L8, L9-L12, L13-L16, L17-L21 and a room controller RC1-RC5 are installed. The room controller RC1-RC5 are connected to a system controller SC. The PDA is in the middle room R3 and executes a program for lighting system control. The program enables a user to wirelessly control luminaries L1-L21 of the lighting control system. For controlling luminaries, the lighting control system must know in which the room the PDA actually is located. For wireless communication between the PDA and the room controller RC1-RC5 different technologies can be used, for example WiFi™, Bluetooth®, ZigBee™. When a user wishes to switch on the luminaries L9-L12 in room R3, he may press a button of the program for controlling the lighting on his PDA. This triggers the program to transmit a RF signal to the room controller RC1-RC5 for switching on luminaries in one of the rooms R1-R5. Each room controller RC1-RC5 measures the strength of the RF signal. It is now supposed that due to environmental conditions, the RSSI measured by the room controller RC3 in the middle room R3 is not the strongest, and the measured signal strengths are (i=RC1, RC2, . . . , RC5): Ri=(20 60 50 60 32) with the weighting values Wi=(0.25 0.5 1 0.5 0.25).

Assuming the PDA is in the middle room R3, the constraints Ai=(0 0 1 0 0) yield a maximum of the total RSSIs 5+30+50+30+8=123.

Assuming the PDA is in the second room R2, the constraints Ai=(0 1 0 0 0) yield the total RSSIs of 10+60+25+15=110.

Assuming the PDA is in the fourth room R4, the constraints Ai=(0 0 0 1 0) yield the total RSSIs of 15+25+60+16=116.

Assuming the PDA is in the fourth room R1, the constraints Ai=(1 0 0 0 0) yield the total RSSIs of 20+30+12.5=62.5.

Assuming the PDA is in the fourth room R5, the constraints Ai=(0 0 0 0 1) yield the total RSSIs of 12.5+30+32=74.5.

Even though the signal was stronger in the second and fourth room R2 and R4, respectively, the weighted result yields the correct location of the PDA in room R3. The invention can be applied to any networked control systems, particularly networked lighting control systems, where by means of an installation plan positions of devices such as luminaires and switches in rooms and the relative locations of the rooms are known. The invention can particularly be used to improve the commissioning of devices of a networked control system. Particularly, the invention can help to reduce the commissioning effort and to remove errors.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A method for automatically commissioning of devices of a networked control system, which comprises one or more first devices and one or more second devices being able to communicate wirelessly, wherein wireless signals from the first devices are received by the one or more second devices and for each received wireless signal a corresponding signal strength is measured, and wherein the method comprises:
 processing, by at least one hardware processor, the measured signal strengths considering constraints derived from an installation of the networked control system for commissioning;

assigning, by the at least one hardware processor, the first devices to at least one second device of the one or more of the second devices depending on the processing result, wherein the processing further comprises weighting the measured signal strength of each received wireless signal depending on the installation; wherein the assigning automatically commissions the at least one second device to control the assigned one or more first devices and implementing wireless communication between the assigned one or more first devices and the at least one second device based on the assigning.

2. The method of claim 1, wherein said weighting considers said constraints, wherein the installation of the networked control system comprises one or more rooms and said constraints derived from the installation are one or more of:

number of the first devices in each room;
number of the second devices in each room; or
number of the rooms to which at least one of the first devices is assigned.

3. The method of claim 2, wherein the step of processing comprises the following steps:

determining the total signal strength for several different possible assignments of first devices and second devices, which fulfill the constraints derived from the installation of the networked control system, and selecting the assignment of first devices and second devices with the largest total signal strength among the determined total signal strengths.

4. The method of claim 3, wherein the step of determining the total signal strength comprises a brute force method over all possible permutations of allocations of first devices and second devices or a heuristic method.

5. The method of claim 1, wherein the values for weighting the signal strengths are estimated based on actual measurements of the signal strengths of wireless signals.

6. A non-transitory computer readable medium comprising a computer-readable program including a program of instructions which, when executed on a computer, causes the computer to perform the method of claim 1.

7. A commissioning tool for a networked control system comprising:

a communications module for communicating with devices of the networked control system and to receive from one or more second devices signal strengths of wireless signals from one or more first devices received and measured by the one or more second a processor being configured to:

process the measured signal strengths considering constraints derived from an installation of the networked control system for commissioning, and perform an assignment of the one or more first devices to at least one second device of the one or more second devices depending on a result of the process of the measured signal strengths, wherein the process further comprises weighting the measured signal strength of each received wireless signal depending on the installation, wherein the assigning automatically commissions the at least one second device to control the assigned one or more first devices and wherein wireless communication between the assigned one or more first devices and the at least one second device is implemented based on the assignment.

8. A networked control system comprising:
one or more first devices;
one or more second devices being adapted for receiving wireless signals from the one or more first devices and for measuring for each received wireless signal a corresponding signal strength; and
a system controller comprising at least one processor being configured to
receive the measured signal strengths,
process the measured signal strengths considering constraints derived from an installation of the networked control system for commissioning, wherein the process comprises weighting the measured signal strength of each received wireless signal depending on the installation, and
perform an assignment of the one or more first devices to at least one second device of the one or more second devices depending on the process result wherein the assigning automatically commissions the at least one second device to control the assigned one or more first devices and, wherein wireless communication between the assigned one or more first devices and the at least one second device is implemented based on the assignment.

9. The networked control system of claim 8, wherein
the one or more first devices are wireless switches and/or computers being adapted for wirelessly communicating with second devices, and
the second devices are wireless room controllers and/or wireless luminaries.

10. The networked control system of claim 8, wherein the first devices and the second devices are wireless luminaries.

11. The networked control system of claim 8, wherein the system controller (SC) is integrated in a second device.

12. The method of claim 1, wherein the weighting comprises altering at least one of the measured signal strengths while applying the constraints to the at least one of the measured signal strengths.

13. The commissioning tool of claim 7, wherein the weighting comprises altering at least one of the measured signal strengths while applying the constraints to the at least one of the measured signal strengths.

14. The networked control system of claim 8, wherein the weighting comprises altering at least one of the measured signal strengths while applying the constraints to the at least one of the measured signal strengths.

15. The commissioning tool of claim 7, wherein said weighting considers said constraints, wherein the installation of the networked control system comprises one or more rooms and said constraints derived from the installation are one or more of:
number of the first devices in each room;
number of the second devices in each room; or
number of the rooms to which at least one of the first devices is assigned.

16. The networked control system of claim 8, wherein said weighting considers said constraints, wherein the installation of the networked control system comprises one or more rooms and said constraints derived from the installation are one or more of:
number of the first devices in each room;
number of the second devices in each room; or
number of the rooms to which at least one of the first devices is assigned.

* * * * *